(12) United States Patent
Nakajima et al.

(10) Patent No.: US 7,155,053 B2
(45) Date of Patent: Dec. 26, 2006

(54) COLOR IMAGE PROCESSING METHOD AND APPARATUS

(75) Inventors: Masato Nakajima, Kanagawa (JP); Shingo Ando, Kanagawa (JP); Satoko Imai, Kanagawa (JP)

(73) Assignees: Olympus Corporation, Tokyo (JP); Keio University, Tokyo (JP)

( * ) Notice: Subject to any disclaimer, the term of this patent is extended or adjusted under 35 U.S.C. 154(b) by 755 days.

(21) Appl. No.: 10/436,600

(22) Filed: May 13, 2003

(65) Prior Publication Data

US 2004/0228522 A1 Nov. 18, 2004

(51) Int. Cl.
*G06K 9/00* (2006.01)

(52) U.S. Cl. ...................................... 382/162
(58) Field of Classification Search ................ 382/162, 382/167, 168; 358/1.9, 2.1, 518–520; 356/402; 345/603
See application file for complete search history.

(56) References Cited

U.S. PATENT DOCUMENTS 5,089,976 A * 2/1992 Cate et al. .................. 356/402
5,450,216 A * 9/1995 Kasson ........................ 358/518
6,995,865 B1 * 2/2006 Motomura .................. 358/1.9

FOREIGN PATENT DOCUMENTS

| JP | 03-073668 | 3/1991 |
|---|---|---|
| JP | 06-141229 | 5/1994 |
| JP | 07-298142 | 11/1995 |
| JP | 08-046860 | 2/1996 |
| JP | 10-261077 | 9/1998 |
| JP | 2001-118062 | 4/2001 |

* cited by examiner

*Primary Examiner*—Jose Couso
(74) *Attorney, Agent, or Firm*—John C. Pokotylo; Straub & Pokotylo

(57) ABSTRACT

A color type converting means 3 generates, from a primary color image, an intensity image in a hue/saturation/intensity space normalized in a cylindrical coordinate system. A region dividing means 6 analyzes the texture of the intensity image and divides the intensity image into a plurality of regions on the basis of the result of the analysis. A density conversion curve generating means 7 generates a density conversion curve for each intensity image by smoothing the histogram for each divided region. A density converting means 8 executes density conversion of the intensity image by using the smoothing a histogram of each region. A region dividing means 5 generates a primary color image by using the intensity image which is density-converted.

5 Claims, 19 Drawing Sheets

(a) RGB CUBE (b) PARALLEL PROJECTION TO I-T PLANE (c) TWIN HEXAGONAL PYRAMID COLOR MODEL (a)

(b)

(c)

(d)

(a)

(b)

(a)

(b)

(c)

H min: Minimum value of Entropy in whole regions
H max: Maximum value of Entropy in whole regions
CL max: Experimentally determined value (a) $\sigma=1.5$ (b) $\sigma=3.0$ (a)  (b)

(c)

(a)          (b)

COLOR IMAGE PROCESSING METHOD AND APPARATUS

BACKGROUND OF THE INVENTION

The present invention relates to color image processing method and apparatus suitable for electronic imaging systems such as video cameras or digital cameras and, more particularly, to method of and apparatus for improving the dynamic range.

It may happen a case of imaging a scene, in which very bright and very dark parts coexist, for instance the face of a person in a room with a window on the back, with an electronic imaging system and displaying this image on a monitor or outputted from a printer. In this case, such a phenomenon as losing of very bright parts and squeezing of very dark parts occurs, so that it becomes impossible to reduce detailed data which must have been obtained with an imaging element of an electronic imaging system. This phenomenon stems from the fact that the dynamic range of an image output system such as a monitor or a printer is narrower than the dynamic range of the image outputted from the electronic imaging system.

Heretofore, various methods have been proposed for reducing the above loss of detail data. As an example, Japanese Patent No. 2951909 discloses gradation compensation apparatus and method for an imaging system, in which an input image is divided into a plurality of blocks like a square grating, the average brightness of each block is computed, and gradation compensation is made for each division region based on the computed average brightness.

According to the Japanese Patent No. 2951909, however, the division of the input image into regions is made based on the average brightness of the block. This means that, for instance, when a texture A, in which the brightness is changed stepwise in a narrow brightness range as shown in FIG. 19(a), and a texture B, in which the brightness is changed stepwise in a broad brightness range as shown in FIG. 19(b), are adjacent to each other, the two textures are regarded to be in the same region, and the same gradation compensation curve is thus used for the gradation compensation. Therefore, when the gradation compensation curve is preset to be best for the texture A, it may result in the losing of very bright parts of the texture B and squeezing of very dark parts of the same texture. On the other hand, when the gradation compensation curve is preset to be best for the texture B, it may become impossible to reproduce the stepwise brightness changes in the texture A.

The inventors earlier proposed an automatic dynamic range compression method, in which an input image is divided into a plurality of regions, and a peculiar density conversion process to each region is executed. In this method, the texture of the input image is analyzed, and the regions are determined based on the result of the analysis (Japanese Patent Application No. 11-333205). This automatic dynamic range compression method has an advantage that it can reduce loss of useful data compared to the prior art method.

SUMMARY OF THE INVENTION

The present invention seeks to provide method of and apparatus for applying the above automatic dynamic range compression method to color image.

According to an aspect of the present invention, there is provided a color image processing method comprising: a step of generating, from a primary color image, an intensity image in a hue/saturation/intensity space normalized in a cylindrical coordinate system; a step of analyzing the texture of the intensity image and dividing the intensity image into a plurality of regions based on the result of the analysis; a step of executing density conversion of the intensity image by smoothing a histogram of each region; and a step of generating a primary color image by using the density-converted intensity image.

With this arrangement, execution of a dynamic range improving process with respect to the intensity, permits execution at the same time of an improvement process with respect to the saturation substantially to the same extent.

In the histogram smoothing, a density histogram is generated for each region, and a first clip value for determining the extent of the histogram smoothing is determined on the basis of the way of intensity fluctuations of each region.

With this arrangement, it is possible to prevent excessive contrast emphasis even when a generated density histogram has a high frequency density part.

The first clip value is determined by using the complexity of the texture of each region in addition to the way of density fluctuations of each region.

With this arrangement, it is possible to prevent an excessive contrast emphasizing process with respect to a region containing a less density difference object.

A second clip value preset for weakening the extent of the histogram smoothing in each region and changing the intensity distribution of the entire region to a uniform intensity, is used together with the first clip value.

With this arrangement, it is possible to reduce the extent of the contrast emphasis and make a uniform intensity of the whole region.

According to another aspect of the present invention, there is provided a color image processing system comprising: a means for generating, from a primary color image, an intensity image in a hue/saturation/intensity space normalized in a cylindrical coordinate system; a means for analyzing the texture of the intensity image and dividing the intensity image into a plurality of regions on the basis of the result of the analysis; a means for executing density conversion of the intensity image by smoothing a histogram of each region; and a means for generating a primary color image by using the density-converted intensity image.

With this arrangement, with dynamic range improving process made for the intensity, it is possible to make an improvement process of substantially the same order at the same time for the saturation.

Other objects and features will be clarified from the following description with reference to attached drawings.

PREFERRED EMBODIMENTS OF THE INVENTION

Preferred embodiments of the present invention will now be described with reference to the drawings.

Figure 1:
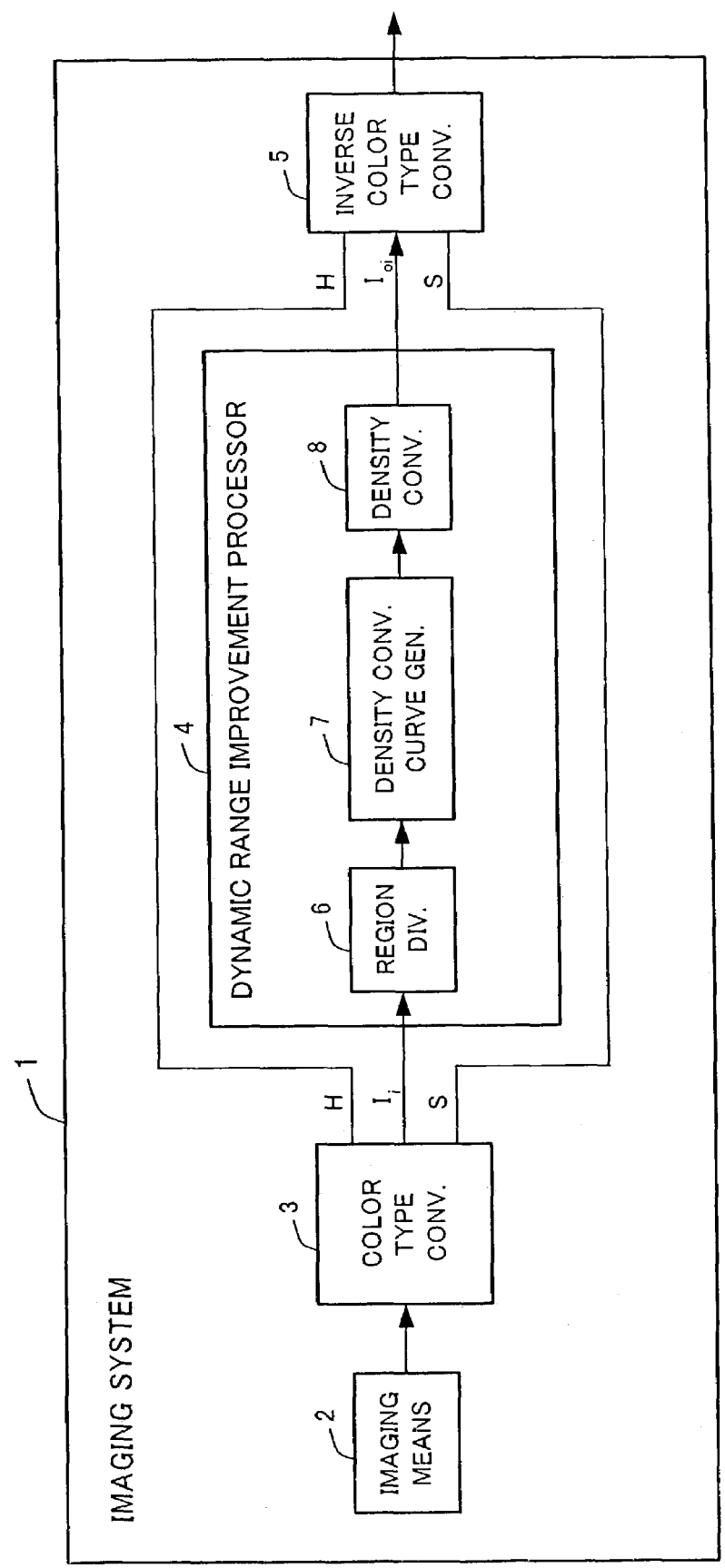
FIG. 1 is a block diagram showing the construction of an imaging system according to a first embodiment of the present invention.
Figure 2:
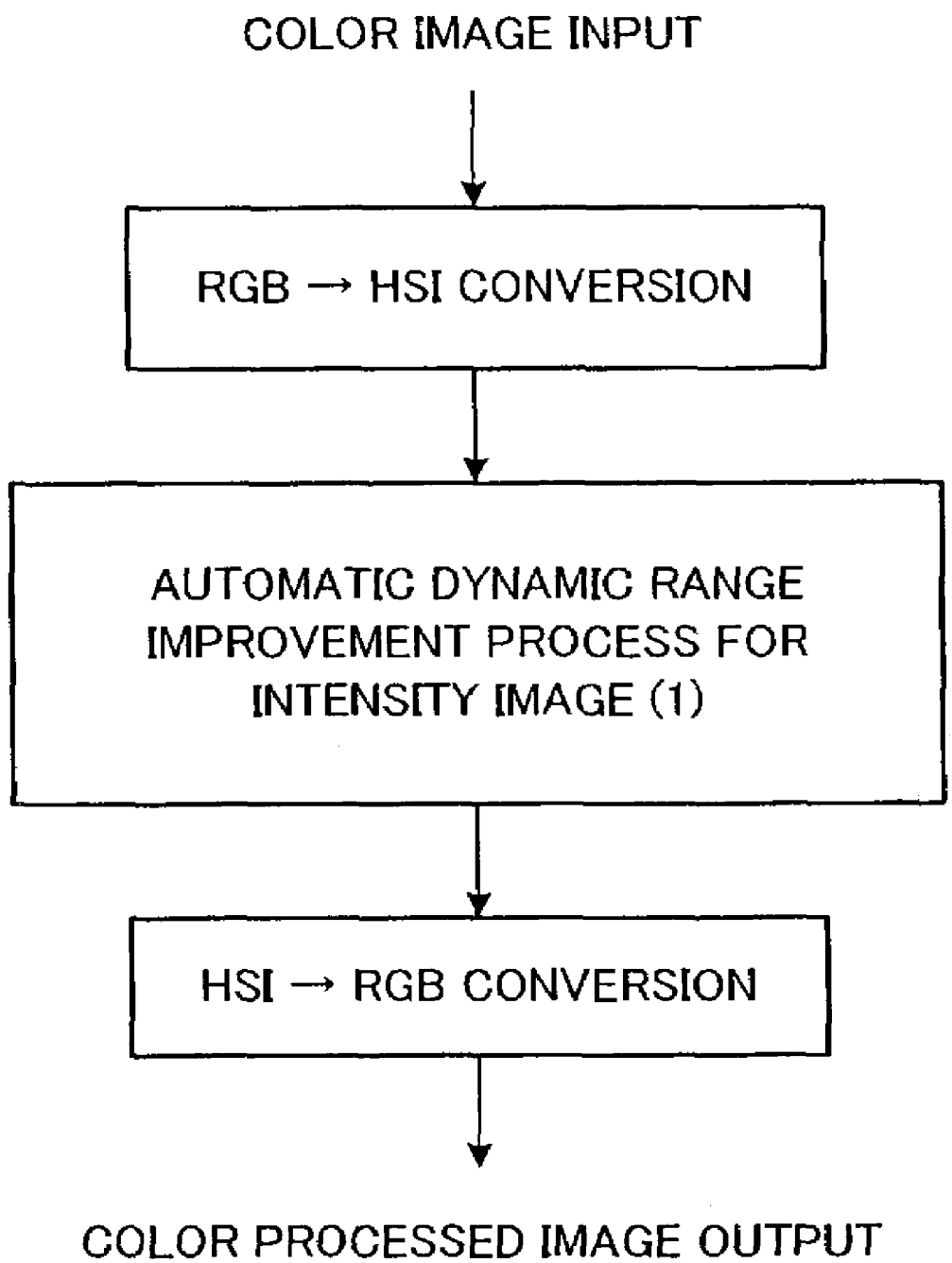
FIG. 2 is a flow chart illustrating a summary of the process flow in the imaging system in FIG. 1.

FIG. 1 is a block diagram showing the construction of an imaging system according to a first embodiment of the present invention. FIG. 2 is a flow chart illustrating a summary of the process flow in the imaging system.

As shown in FIG. 1, the imaging system comprises an imaging means 2, a color type converting means 3, a dynamic range improvement processor 4, and an inverse color type converting means 5.

The imaging means 2 includes a semiconductor imaging element such as a CCD, and it functions to image a scene object to generate an RGB primary color image data and output the data to the color type converting means 3.

The color type converting means 3 executes step S1 in FIG. 2, i.e., it converts the RGB primary color image data to image data of HSI space called HSI system consisting of H (hue), S (saturation) and I (intensity).

Figure 3:
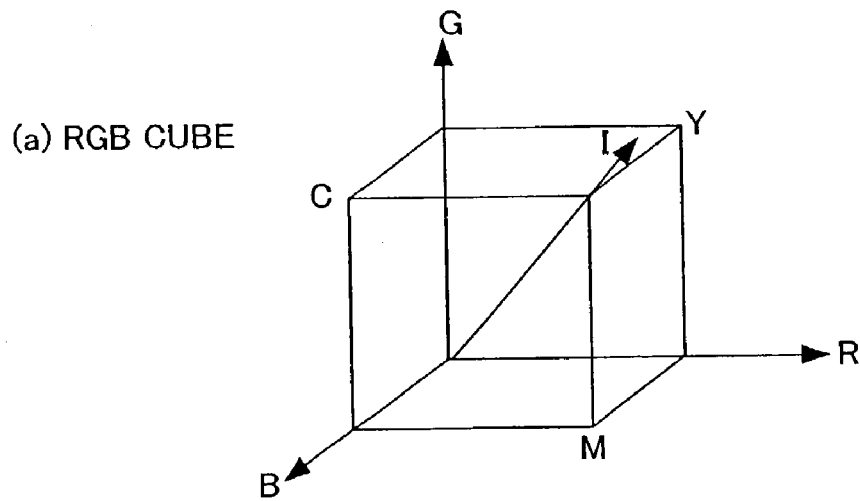
FIGS. 3(a) to 3(c) are views for explaining a twin hexagonal color model.
Figure 3:
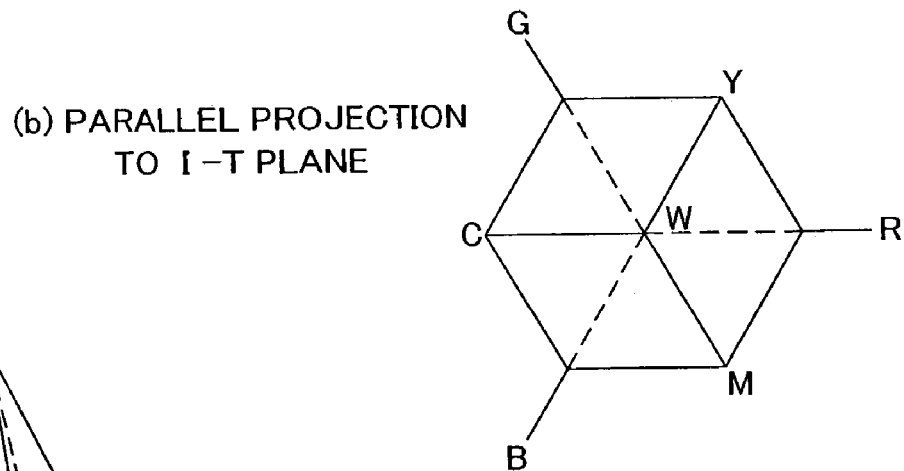
Figure 3:
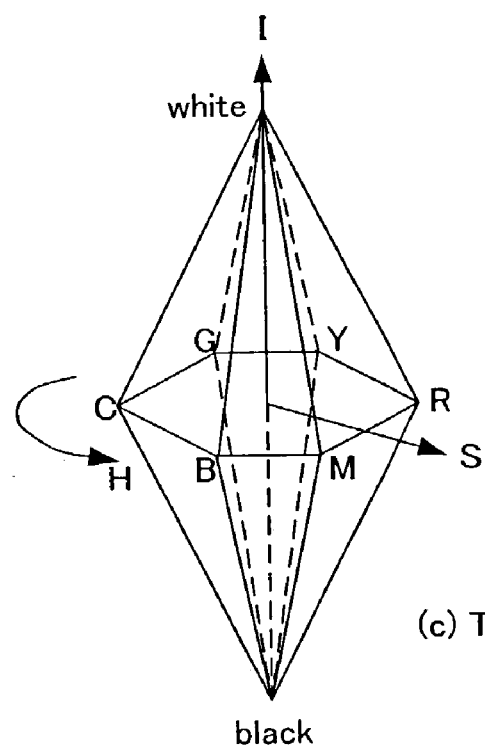

Correspondence of the RGB space and the HSI space to each other may be provided in various models. Here, conversion in a twin hexagonal pyramid color model is dealt with. The concept of the twin hexagonal color model will be described with reference to FIGS. 3(a) to 3(c). FIG. 3(a) illustrates the setting of intensity axis in the RGB space, FIG. 3(b) illustrates the manner of projection on a plane normal to the intensity axis, and FIG. 3(c) shows a twin hexagonal pyramid HSI space obtained after projection.

In each color image pixel, the HSI values are computed from the RGB values by using the above twin hexagonal pyramid color model. The intensity data (or intensity value) represents the luminance component of the color image, and it is identical with monochromatic image data generated from color image data.

Figure 4:
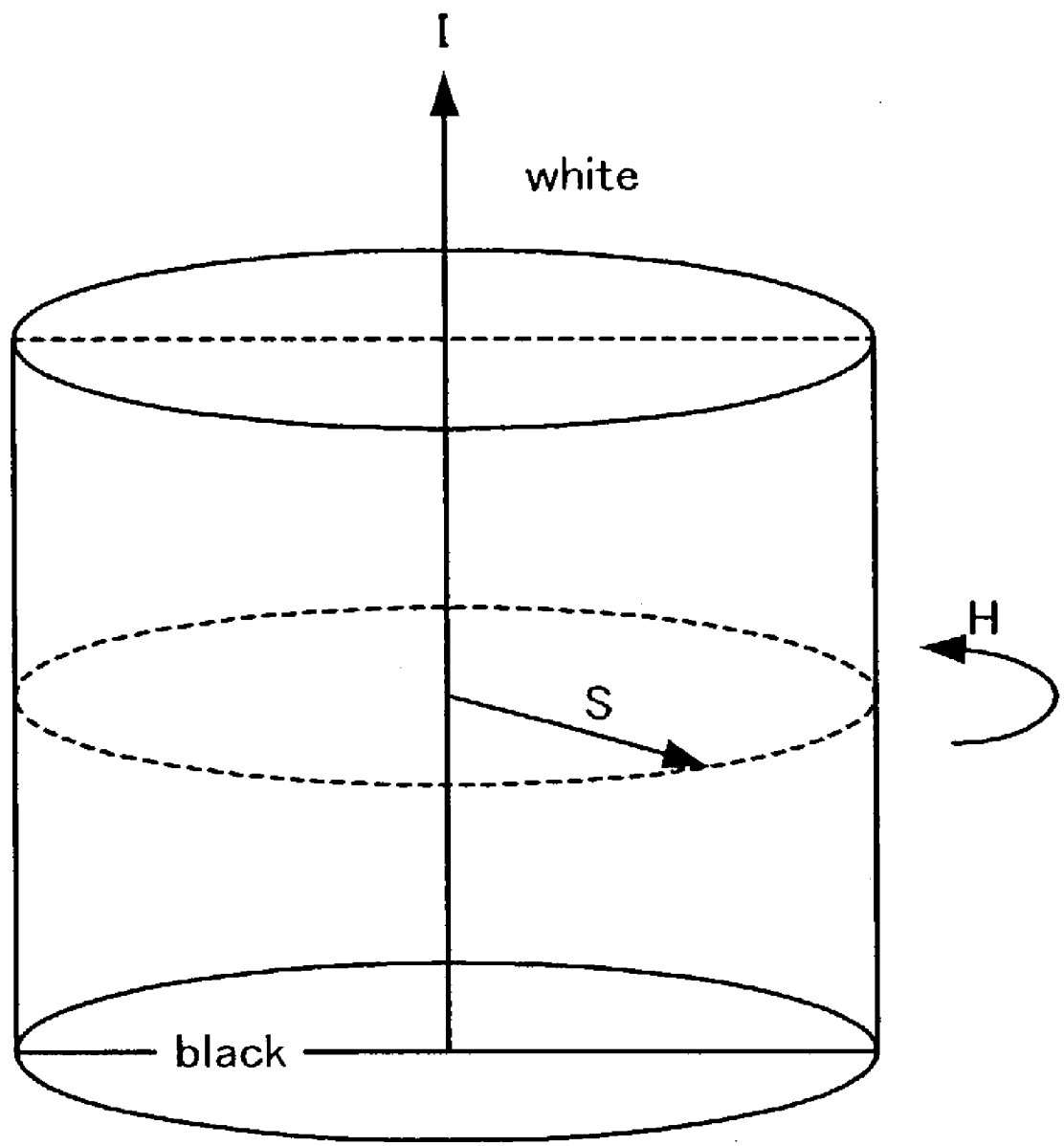
FIG. 4 is a view for describing an HSI space normalized with a cylindrical coordinate system.

In the first embodiment of the present invention, as shown in FIG. 4, an HSI space which is obtained by normalizing the twin hexagonal pyramid color model with a cylindrical coordinate system is adopted for conversion of RGB to HSI and also for conversion of HSI to RGB. An example of algorithms in the conversion of RGB to HSI and conversion of HSI to RGB will be described.

Considering a cube contiguous to the three axes of RGB rectangular coordinate system, colors R, G and B and their complementary colors C, M and Y are in a position relationship as shown in FIG. 3(a). Denoting the main diagonal axis of the RGB cube to be intensity axis I, on apex thereon to be black of I=0 and the other apex as white of I=1, we define $$I=((\max R, G, B)+\min(R, G, B))/2.$$

By making parallel projection of the RGB cube on a plane normal to the I axis, a right hexagon as shown in FIG. 3(b) is formed. The hue H and the saturation S are defined on a plane normal to the I axis as shown in FIG. 3(c). The method of conversion will be shown hereinunder. It is assumed that the value range of R, G, B, S, I is (0, 1), and H has a value of (0, 2π).

(1) Conversion From RGB to HSI

First, I is defined as $$I=(I_{max}+I_{min})/2$$

where: $I_{max}=\max(R, G, B)$ and $I_{min}=\min(R, G, B)$ i) When $I_{max}=I_{min}$:
S=0, and
H is indefinite.

ii) When $I_{max} \neq I_{min}$:
S is defined as follows.

When $I \leq 0.5$: $S=(I_{max}-I_{min})/(I_{max}+I_{min})$; and

When $I > 0.5$: $S=(I_{max}-I_{min})/(2-I_{max}+I_{min})$.

Then, r, g and b are defined as follows.

$$r=(I_{max}-R)/(I_{max}-I_{min}),$$

$$g=(I_{max}-G)/(I_{max}-I_{min}), \text{ and}$$

$$b=(I_{max}-B)/(I_{max}-I_{min}).$$

Finally, H is defined as follows.

When $R=I_{max}$: $H=\pi/3(b-g)$;

When $G=I_{max}$: $H=\pi/3(2+r-b)$; and

When $B=I_{max}$: $H=\pi/3(4+g-r)$.

(2) Conversion From HSI to RGB

First, $M_1$ and $M_2$ are obtained as follows.

When $I \leq 0.5$: $M_2=I \cdot (1+S)$, and

When $I > 0.5$: $M_2=I+S-I \cdot S$, and $M_1=2I-M_2$.

i) When S=0:

R=G=B=1.

ii) When S≠0:
①: Process #1

Process #2 to be described later is executed with h=H+ (2/3)π, and R is defined as follows by using he obtained value of X.

R=X.

Process #2 to be described later is executed with h=H, and G is defined as follows by using the obtained value of X.

G=X.

Process #2 to be described later is executed with h=H− (2/3)π, and B is defined as follows by using the obtained value of X.

B=X.

②: Process #2
First, $h_a$ is defined as follows.

$h_a$=h.

When h<0: $h_a$=h+2π, and

When h>2π: $h_a$=h−2π.

Then, X is defined as follows in dependence on the value of $h_a$.

When $h_a$<π/3: X=$M_1$+($M_2$−$M_1$)·$H_a$/(π/3);

When (π/3)≤$h_a$<2π: X=$M_2$;

When π≤$h_a$<(4/3)π: X=$M_1$+($M_2$−$M_1$)·((4/3)π−$h_a$/(π/3)); and

When (4/3)π≤$h_a$<2π: X=$M_1$.

Figure 5:
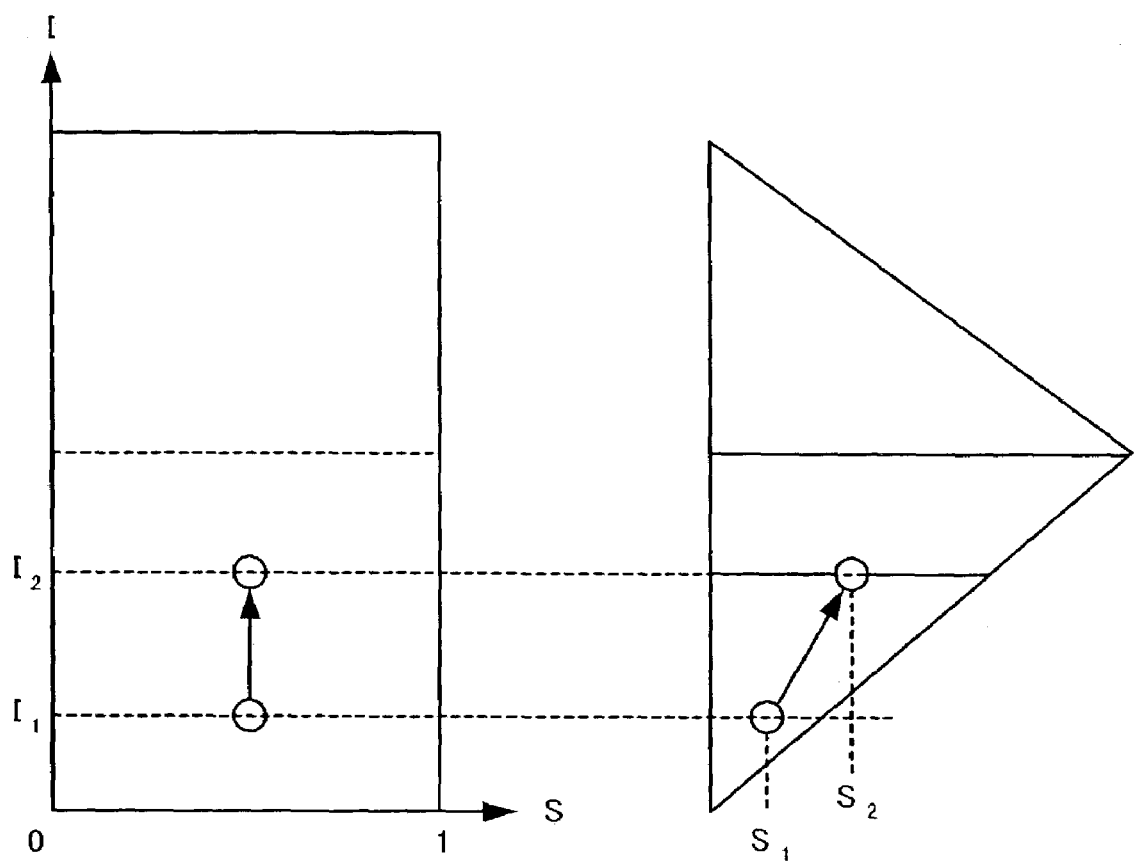
FIG. 5 is a view showing the correspondence relation between the HSI space normalized with the cylindrical coordinate system and the twin hexagonal pyramid color model.

By using the HSI space normalized with the cylindrical coordinate system in the above way, by mere execution of dynamic range compression with respect to the intensity data, permits execution at the same time of compensation with respect to the saturation data (i.e., saturation) to the same extent. This will be described in greater details with respect to FIG. 5. FIG. 5 is a view showing the correspondence relation between a plane defined by the I and S axes of the HSI space normalized by the cylindrical coordinate system and a twin hexagonal pyramid color model. As shown in the Figure, with density conversion in the HSI space normalized with the cylindrical coordinate system from intensity $I_1$ to $I_2$, in the twin hexagonal pyramid color model the saturation is converted from $S_1$ to $S_2$ simultaneously with intensity changes.

The intensity Ii as the output of the color type converting means 3 is inputted to the dynamic range improvement processor 4. The dynamic range improvement processor 4 executes step S2 in FIG. 2 of a predetermined dynamic range improvement process with respect to the intensity $I_i$.

Figure 6:
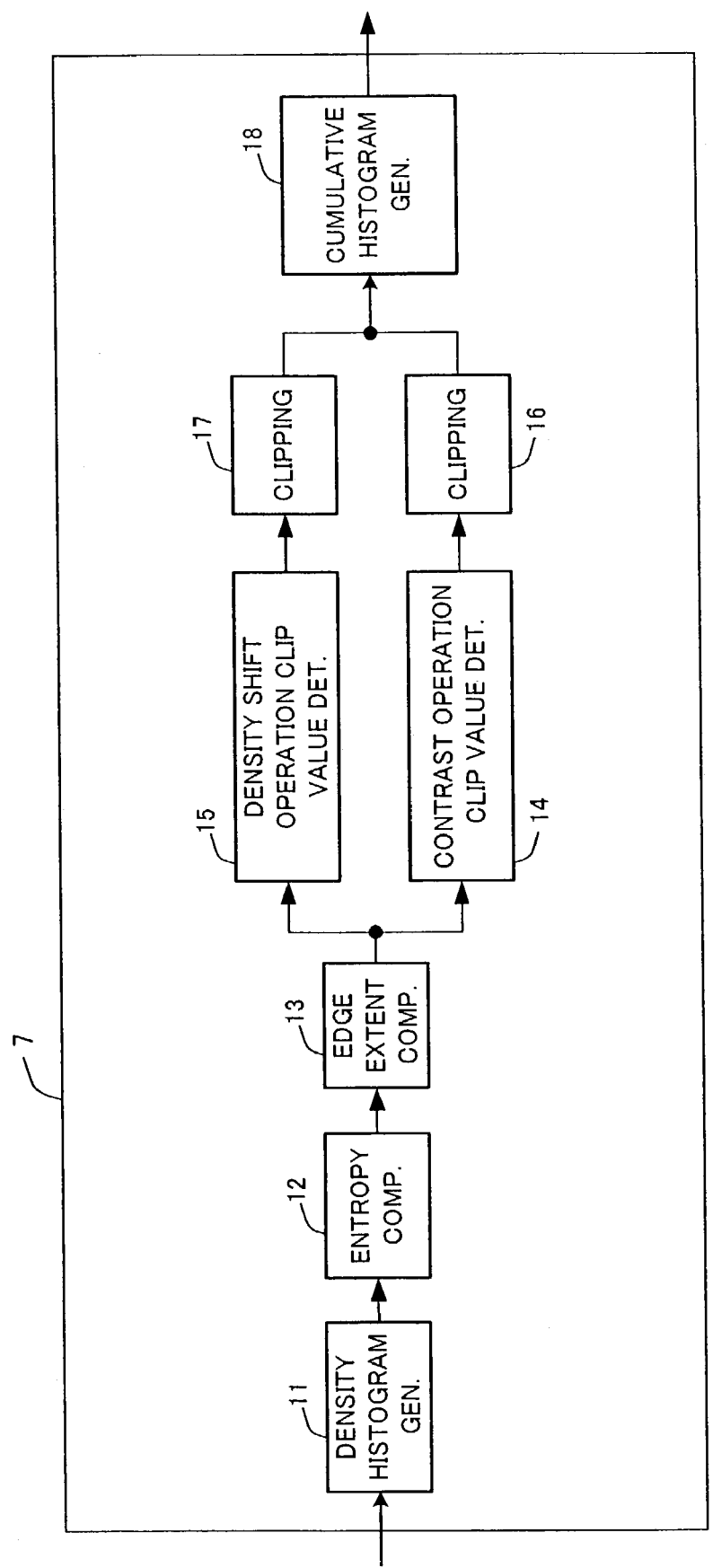
FIG. 6 is a block diagram showing the construction of a density conversion curve generating means in the imaging system shown in FIG. 1.

As shown in FIG. 1, the dynamic range processor 4 includes a region dividing means 6, a density conversion curve generating means 7 and a density converting means 8. The density conversion curve generating means 7, as shown in FIG. 6, has a density histogram generating means 11, an entropy computing means 12, an edge degree computing means 13, a contrast operation clip value determining means 14, a density shift operation clip value determining means 15, a first clipping means 16, a second clipping means 17 and an cumulative histogram generating means 18.

Figure 7:
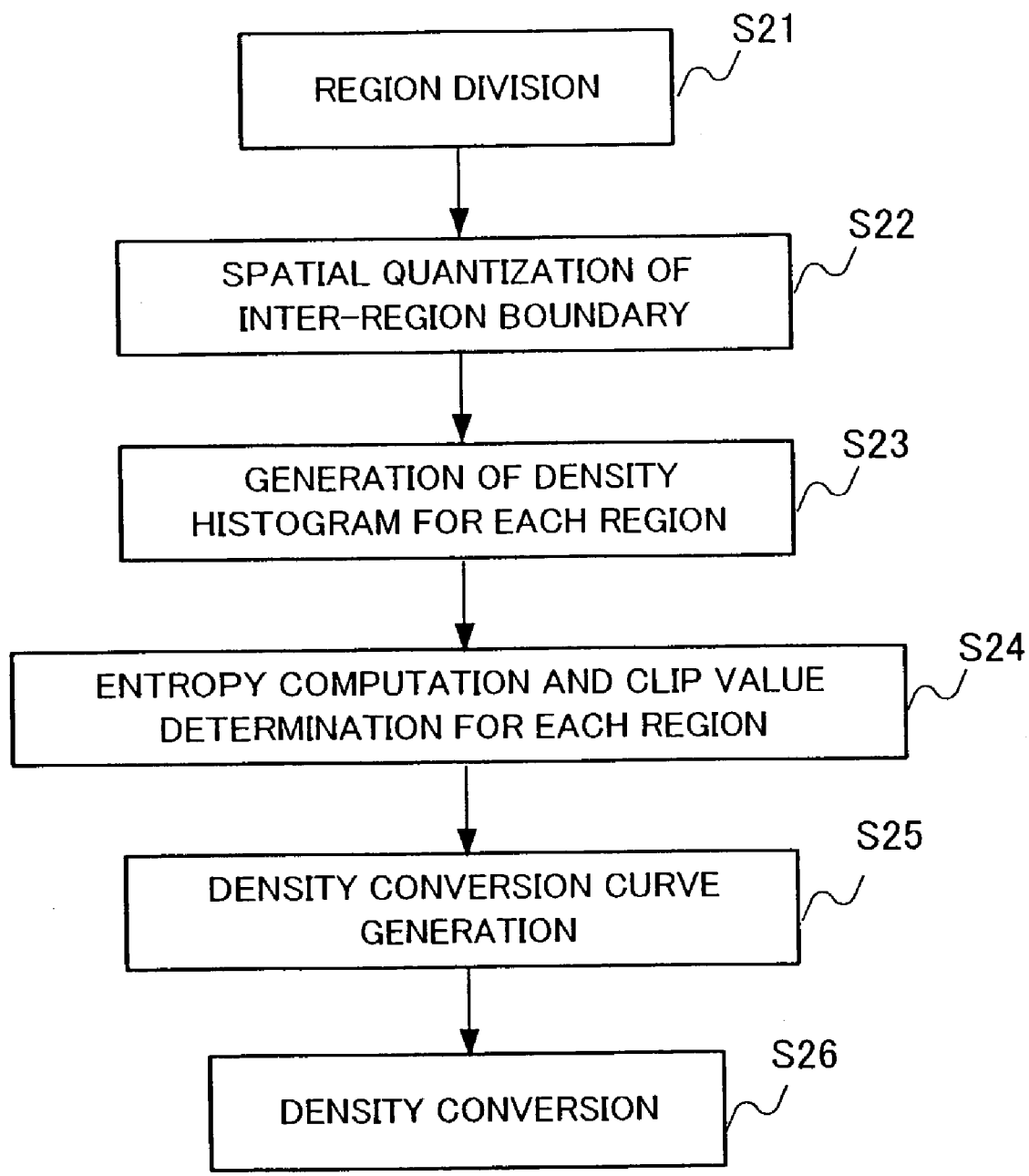
FIG. 7 is a flowchart illustrating a summary of process flow in a dynamic range improving processor in the imaging system shown in FIG. 1.
Figure 8:
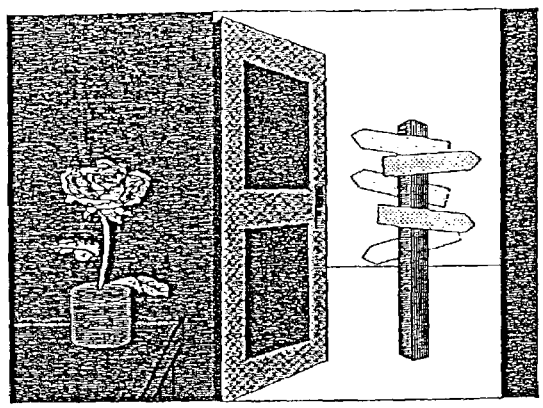
FIGS. 8(a) to 8(d) are views for describing the operation of a region dividing means in the dynamic range improving processor shown in FIG. 1.
Figure 8:
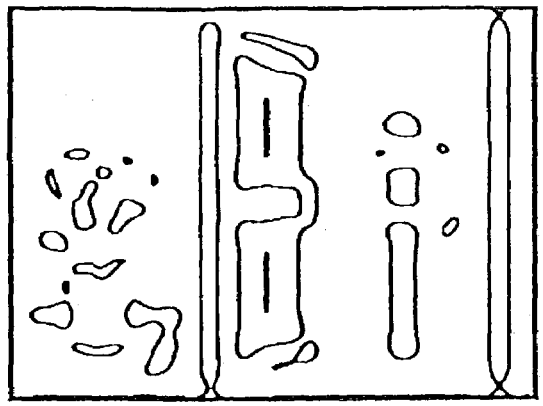
Figure 8:
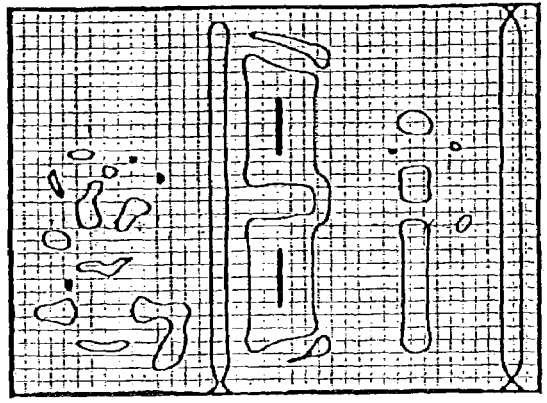
Figure 8:
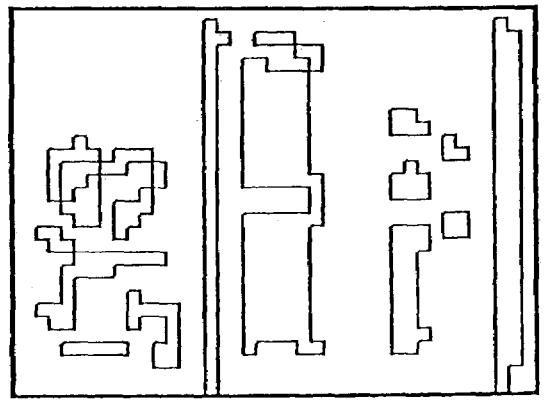

The region dividing means 6 executes region division and spatial quantization of inter-region boundary with respect to an inputted intensity image as shown in steps S21 to S22 in FIG. 7. In the step S21, the texture of the input mage is analyzed, and the input image is divided into a plurality of regions based on the result of the analysis. In the first embodiment of the present invention, region determination is made through a filtering process, in which a LOG (Laplacian Of Gaussian) filter is used for operation with respect to the input image. FIG. 8(b) shows the result of division of an image shown in FIG. 8(a) for region division.

$$\nabla^2 XG(x, y) = \frac{1}{\pi\sigma^4}\left(1 - \frac{r^2}{2\sigma^2}\right)\exp\left(\frac{-r^2}{2\sigma^2}\right) \quad (1)$$

The result of the image division for region division on the basis of the texture analysis and the result of manual and visual image division of the same image by a person for region division may be frequently different from each other. Therefore, the result of the image division on the basis of the texture analysis is directly used, parts of the image, in which the two results are different, may be felt unnaturally to the man's eyes.

Accordingly, in the first embodiment of the present invention, in the next step S22 the result of the image division by analysis in units of pixels is quantized by slightly reducing the resolution. Specifically, as shown in FIG. 8(c), the input image is divided into square blocks, which are then overlapped over the image division result shown in FIG. 8(b), and as for the square blocks corresponding to the inter-region boundaries, the regions, to which these blocks belong, are determined based on the region occupation factor. Thus, the image division result as shown in FIG. 8(b) is quantized as shown in FIG. 8(d).

The image data obtained as a result of spatial quantization in the region dividing means 6 is inputted to the density histogram generating means 11 in the density conversion curve generating means 7. The density histogram generating means 11 executes step S23 in FIG. 7 of generating a density histogram for each region.

Figure 9:
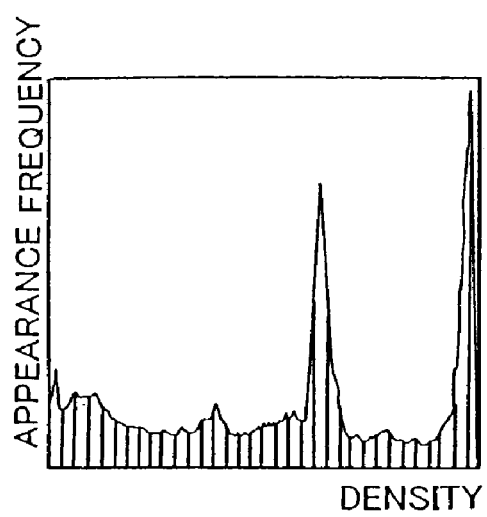
FIGS. 9(a) and 9(b) are views for describing histogram smoothing.
Figure 9:
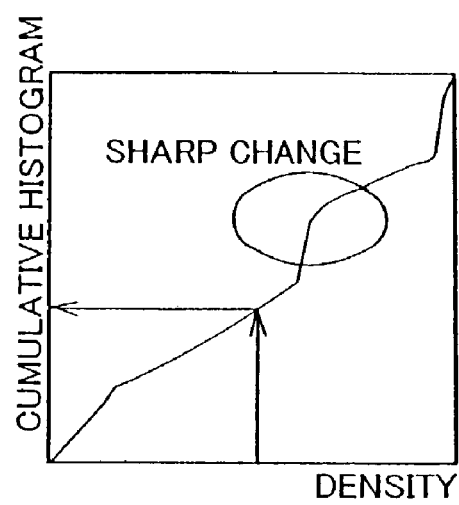

The density conversion curve generating means 7 basically generates a density histogram for each region and then generates a cumulative histogram for each region, the cumulative histogram being used for density conversion. However, this basic process alone poses a problem. For example, when a cumulative histogram as shown in FIG. 9(b) is generated from a density histogram as shown in FIG. 9(a) for density conversion of input density $I_{i0}$ to output density $I_{o0}$, the cumulative histogram is sharply changed in value in a high frequency density part of the density histogram, thus resulting in excessive emphasis of contrast.

Figure 10:
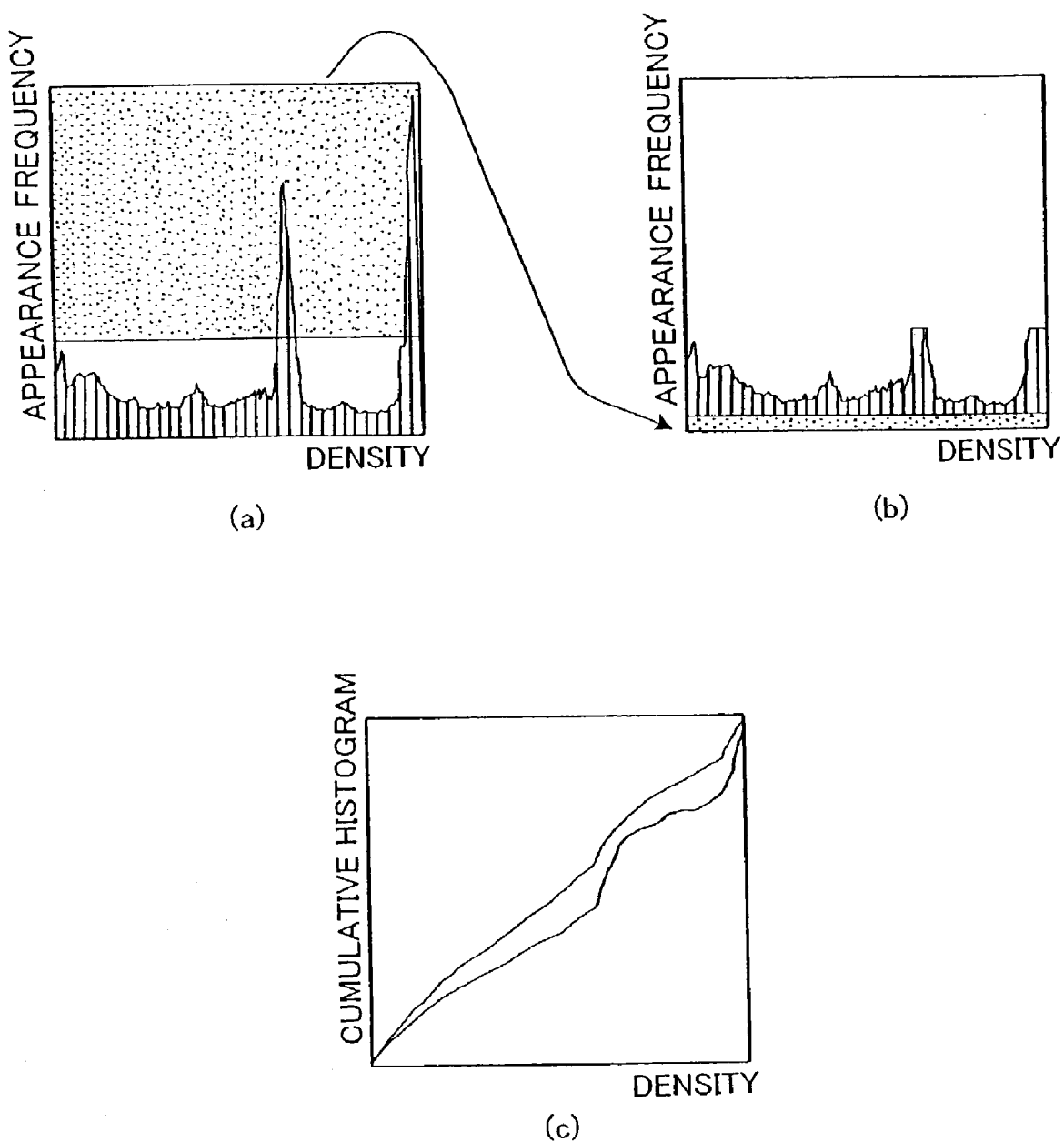
FIGS. 10(a) to 10(c) are views for describing a first clip value.

Accordingly, in the first embodiment of the present invention, a first clip value is introduced to prevent excessive contrast emphasis. Specifically, as shown in FIG. 10(a), a first clip value CL is set with respect to the density histogram, and a portion of the density histogram above the first clip value CL is clipped out. Then, as shown in FIG. 10(b), the density distribution of the clipped-off portion is averaged, and this average level is disposed under the original density histogram after the clipping. That is, the average value of the density distribution of the density histogram part above the first clip value CL constitutes the bias level of the density histogram after the clipping. In FIG. 10(c), curve $A_1$ is a cumulative histogram generated from the density histogram before the clipping, and curve $A_2$ is a cumulative histogram generated from the density histogram after the clipping. It will be obvious from the comparison of the two curves that sharp changes in the cumulative histogram value disappear as a result of the clipping. It is thus possible to prevent excessive contrast emphasis. The extent of smoothing of the density histogram is the greater the greater the first clip value CL and the smaller the smaller first clip value CL.

Figure 11:
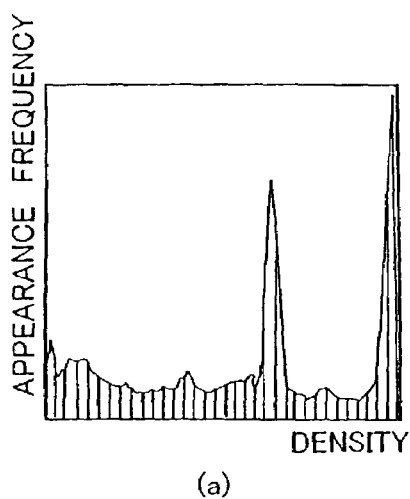
FIGS. 11(a) to 11(c) are views for describing a method of determining the first clip value.
Figure 11:
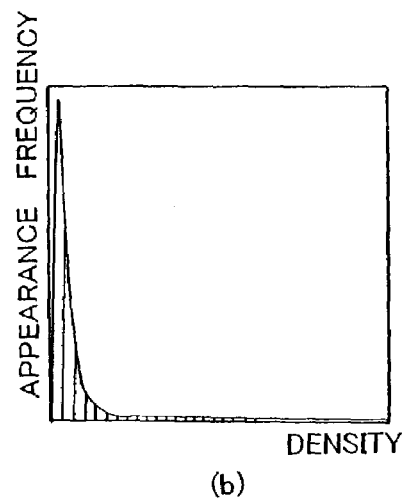
Figure 11:
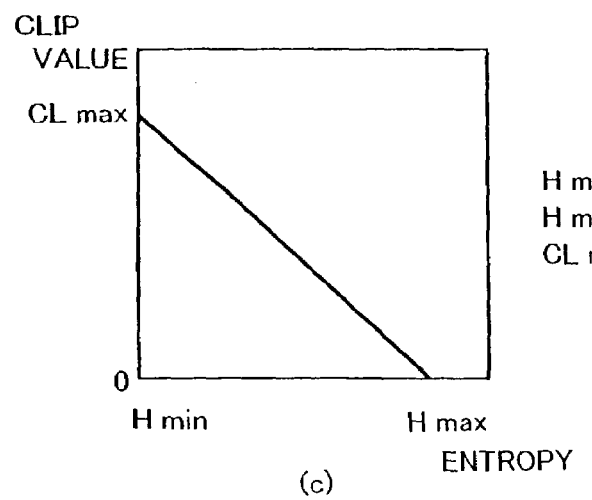

With a range, in which the density fluctuations of the density histogram are large, i.e., the dynamic range is broad as shown in FIG. 11(a), the output of a narrow dynamic range image output unit difficultly results in detail data loss, and it is less necessary to smooth the density histogram. On the other hand, with a region, in which the density fluctuations of the density histogram are small, i.e., the dynamic range is narrow, as shown in FIG. 11(b), the output from the narrow dynamic range image output unit is highly possible to result in detail data loss, and it is thus necessary to broaden the dynamic range by smoothing the density histogram.

In the first embodiment of the present invention, the extent of density histogram density fluctuations is obtained for each region and clip value CL which influences the extent of smoothing of the density histogram is determined based on the extent of fluctuations. Specifically, the entropy computing means 12 obtains the first clip value CL by using a characteristic as shown in FIG. 11(c) by computing entropy H from the following equation (2).

$$E = \sum_{n=0}^{N} \{-p(n)\log p(n)\} \quad (2)$$

where p(n) is the frequency of appearance of density n.

The determination of the clip value as the extent of smoothing of the histogram based on the extent of density histogram density fluctuations alone, leads to the possibility of execution of excessive processing with a region, which contains a less density difference object such as sky or white wall. In the first embodiment of the present invention, the clip value is re-determined by taking the complexity of the texture as well into considerations.

Figure 12:
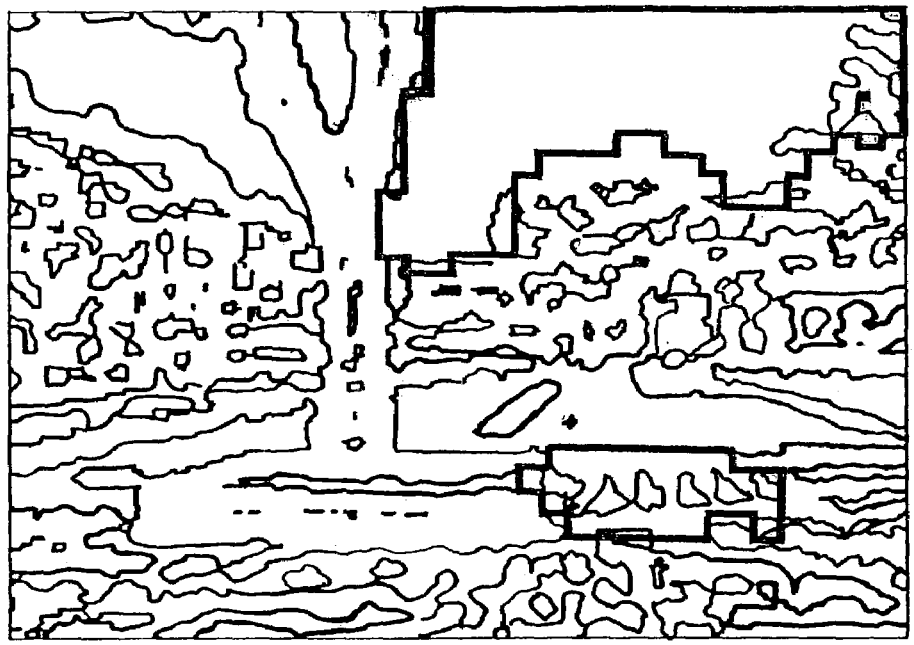
FIGS. 12(a) and 12(b) are views showing an example of obtaining edge extraction images of different σ values.
Figure 12:
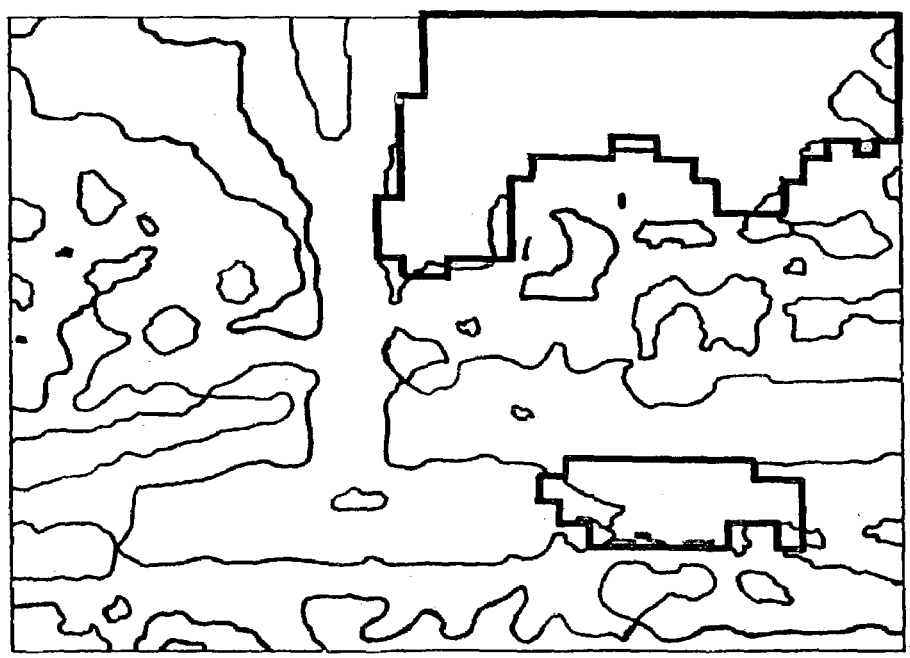

As an index of the complexity of the texture, an edge extraction result is used, which is obtained by computation with LOG filter which has been proposed as a means of image division. When a filtering process, in which a LOG filter with two, i.e., large and small, σ values (space constants) is used for image calculation, different edge extraction images are obtained in dependence on the magnitude of the value. FIGS. 12(a) and 12(b) show an example of the results. In FIGS. 12(a) and 12(b), areas enclosed by bold loops in a right upper part, represent sky. As is obvious from the Figures, so far as a part without density difference as viewed by a man, such as sky, is concerned, the edge number difference of image in that region is small irrespective of whether the σ value is large or small. Accordingly, this feature is used as a value representing the complexity of the texture to re-determine the clip value with the following equation (3), and for a small edge number difference region the extent of smoothing is reduced.

$$CL_{new} = CL_{old} \times \left(1 - \frac{edge_{small}}{edge_{large}}\right) \quad (3)$$

In this equation, $CL_{old}$ is a clip value determined on the basis of the sole density fluctuation extent in the region, $CL_{new}$ is the newly determined clip value, and $edge_{small}$ and $edge_{large}$ are edge numbers in a large and a small σ value region, respectively. The edge numbers $edge_{small}$ and $edge_{large}$ are computed by the edge extent computing means 13, and $CL_{new}$ is computed by the contrast operation clip value determining means 14. The clipping is executed by the first clipping means 16.

The histogram smoothing which is made for each region as described above, is intrinsically a method of contrast emphasis in image processing, and therefore it may give rise to an unnatural result depending on the kind of the texture. An example of such texture is the person's skin. Particularly, in color image application the color difference is pronounced, resulting in pronounced appearance of a defect. Accordingly, in the first embodiment of the present invention, in order to weaken the extent of the histogram smoothing, i.e., the extent of the contrast emphasis, and also prevent data loss at the time of the output, a second clip value is introduced as a measure of intensity compensation of the region.

Figure 13:
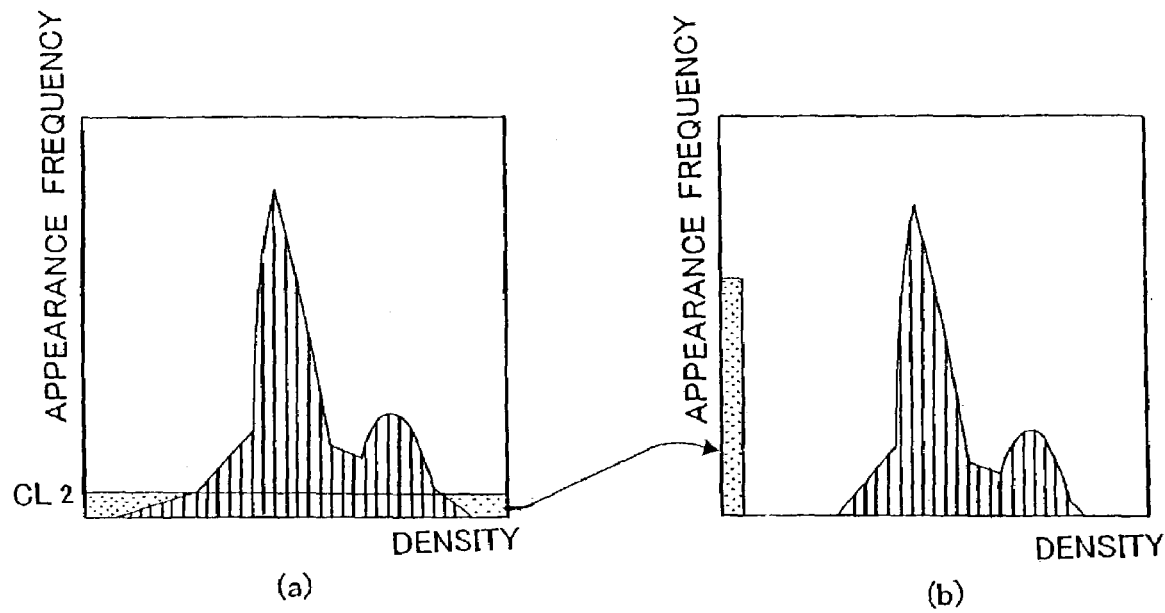
FIGS. 13(a) to 13(c) are views for describing a second clip value.
Figure 13:
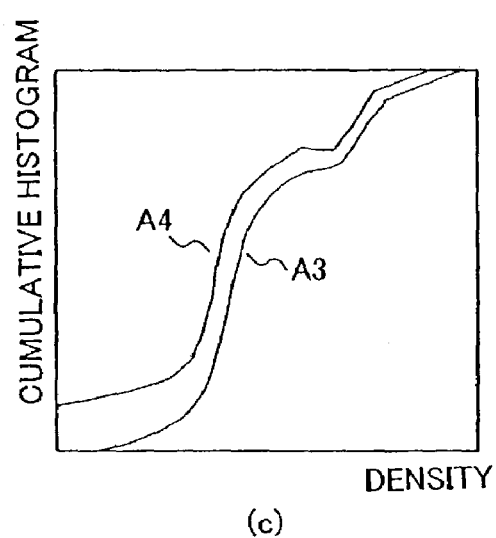

The second clip value is set in a lower part of the density histogram. As shown in FIG. 13(a), in all density distribution of the density histogram, a part below the second clip value $CL_2$ is clipped off, and its summation is added to the frequency part of the minimum density value, i.e., "0", or the maximum frequency value, i.e., "255". FIG. 13(b) shows the case, in which the summation is added to the minimum density value part. A cumulative histogram is generated by using the above clipped density histogram, and this cumulative histogram is normalized to obtain a density conversion curve. In FIG. 13(c), curve $A_3$ is a cumulative histogram obtained from the density histogram before the clipping, and curve $A_4$ is a cumulative histogram obtained from the density histogram after the clipping. As is seen from the shapes of these density conversion curves, by introducing the second clip value it is possible to weaken the extent of the contrast emphasis and obtain a result, in which the intensity distribution of the whole region is changed to a uniform level. The second clip value is determined by the density shift operation clip value determining means 15, and the clipping is executed by the second clipping means 17. The second clip value is preferably in a proportional relation to the first clip value.

The cumulative histogram generating means 18 generates a cumulative histogram by using the density histogram obtained after the clip in the first and second clipping means 16 and 17. The operation of the entropy computing means 12 up to the first and second clipping means 16 and 17 described above corresponds to step S24 in FIG. 7. The operation of the cumulative histogram generating means 18 corresponds to step S25.

The density conversion curve generated in the cumulative histogram generating means 18 is outputted to the density converting means 8. The density converting means 8 executes step S26 of density conversion of each pixel in the region with a peculiar cumulative histogram to each region used as the density conversion curve. However, lest the inter-region boundaries should become discontinuous, the following linear interpolation process is executed for each pixel in the square block pertaining to the boundary.

Figure 14:
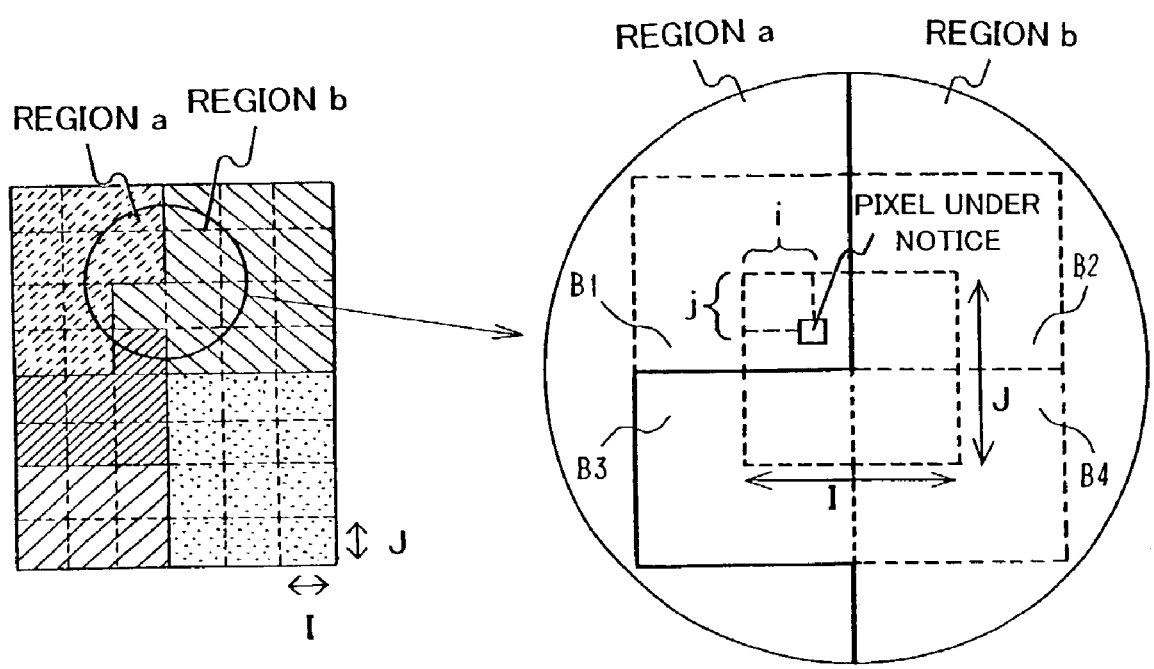
FIG. 14 is a view for describing a linear interpolation method in a density converting means.

As shown in FIG. 14(a), density conversion of the density of a pixel under notice is made by using the density conversion curves of block $B_1$ with the pixel belonging thereto and three neighbor blocks $B_2$ to $B_4$, thus obtaining converted densities $g_1$ to $g_4$. Then, the density g (x, y) after the linear interpolation is computed on the basis of the following equation (4). Specifically, the densities $g_1$ to $g_4$ are weighted based on the distances from the centers of the four blocks $B_1$ to $B_4$ to the pixel under notice.

$$g(x, y) = \frac{J-j}{J}\left(\frac{l-i}{l}g_1 + \frac{i}{l}g_2\right) + \frac{j}{J}\left(\frac{l-i}{l}g_3 + \frac{i}{l}g_4\right) \quad (4)$$

Intensity image data $I_{o1}$ which is obtained as a result of the density conversion process, is outputted from the density converting means 8 and inputted to the inverse color type converting means 5. The inverse color type converting means 5 executes step S4 in FIG. 2 of generating RGB primary color image data with improved dynamic range by using the intensity image data $I_{o1}$ and also the hue and saturation data H and S and the outputs of the color type converting means 3. The generated color image data is inputted to a printer or monitor (not shown) for printing or displaying.

A second embodiment of the present invention features making the intensity value to be closer to the center level of the intensity range, thereby broadening the dynamic range of the saturation and improving the visual recognition property of image.

Figure 15:
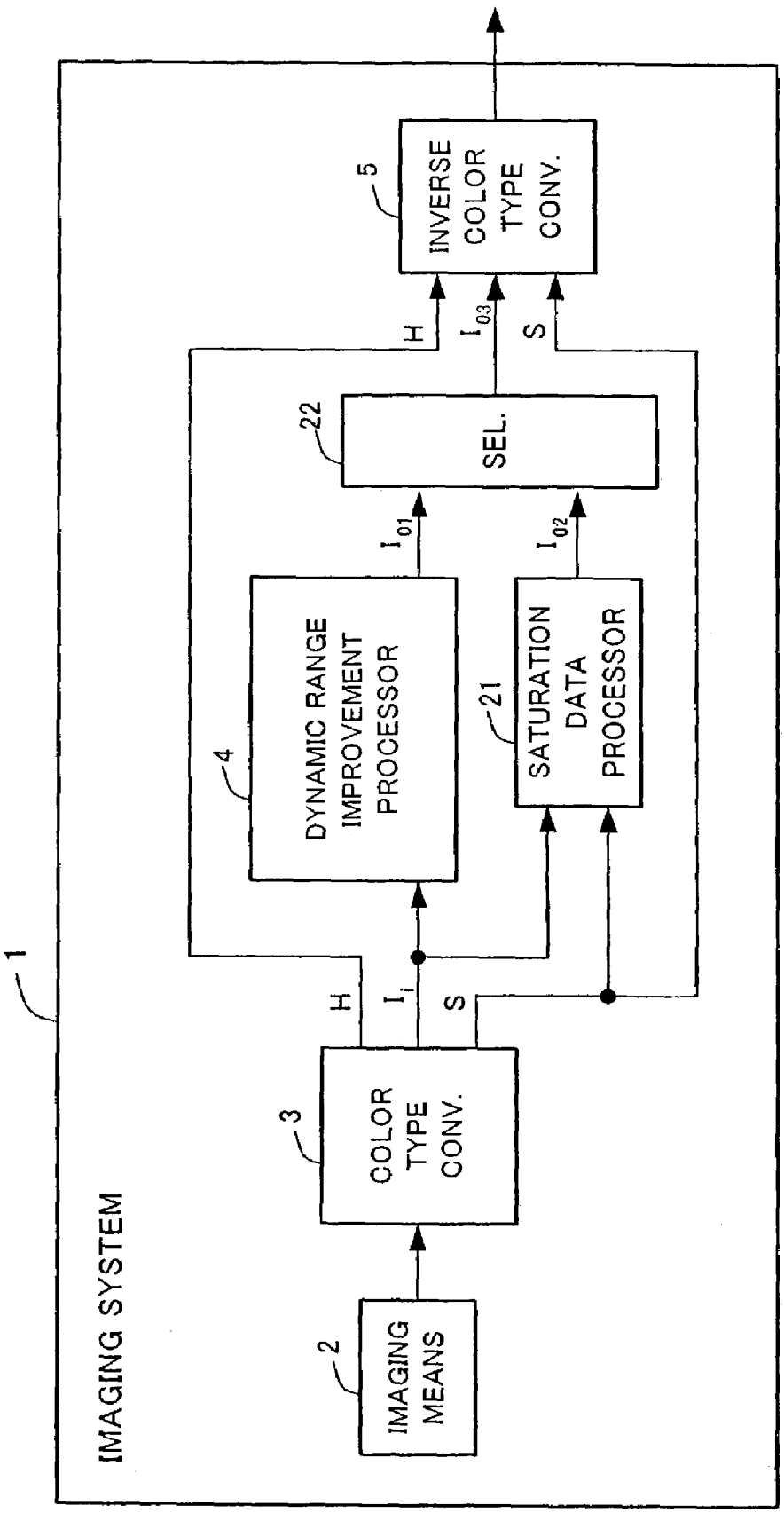
FIG. 15 is a block diagram showing the construction of an imaging system according to a second embodiment of the present invention.
Figure 16:
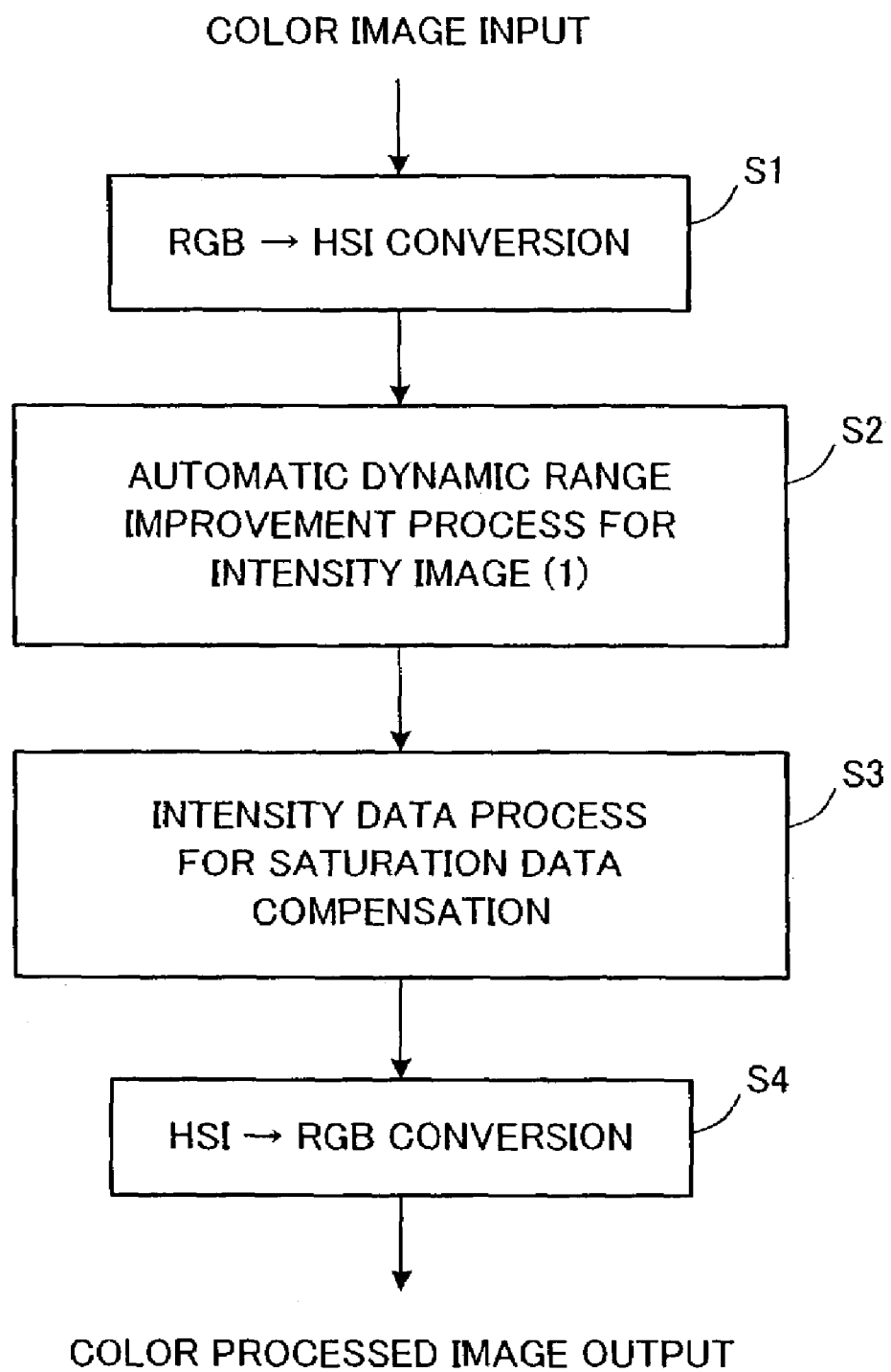
FIG. 16 is a flow chart illustrating a summary of flow of a color image processing in the imaging system shown in FIG. 15.

FIG. 15 is a block diagram showing the construction of an imaging system concerning the second embodiment of the present invention. FIG. 16 is a flowchart illustrating a summary of process flow in the processing in the imaging system. Referring to these Figures, elements like those in FIGS. 1 and 2 are designated by like reference numerals or symbols.

The second embodiment of the present invention features that a saturation emphasis processor 21 and a selector 22 are provided as shown in FIG. 15 and also that an intensity data process as shown in step S3 in FIG. 16 is executed for saturation data compensation. For the remainder of the construction and operation, this embodiment is the same as the first embodiment for the present invention as described before.

Figure 17:
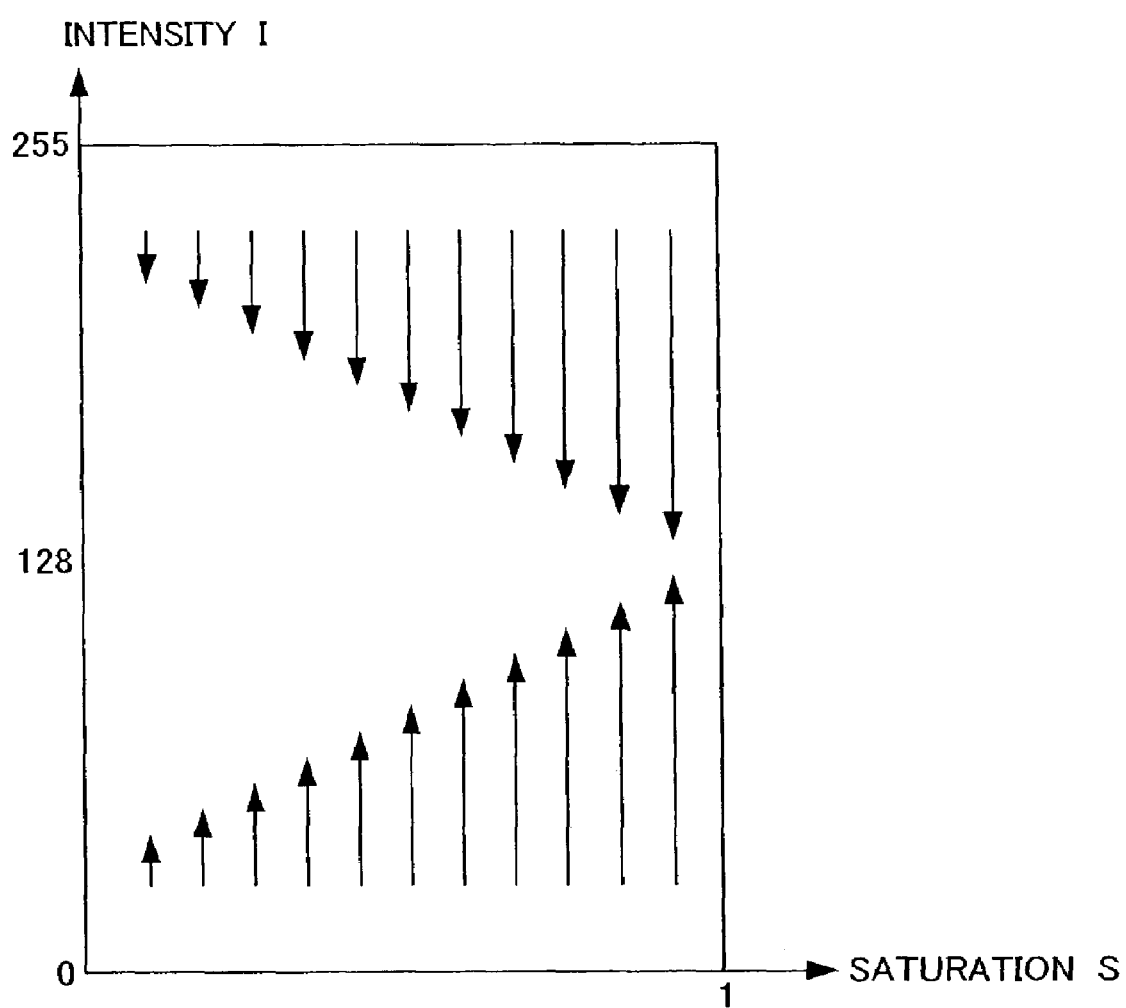
FIG. 17 is a view for describing an intensity data process for saturation data compensation in the imaging system shown in FIG. 15.

The intensity data process for the saturation data compensation is such that the following process is provided with respect to the intensity for broadening the dynamic range of sharp color data. When the saturation has a certain value, that is, when the more it is distant from the I axis in the cylindrical coordinate system in FIG. 4, the intensity value is shifted in the direction of increasing the dynamic range of the saturation. When the saturation has a certain value, this process makes the sharpness of color to be more readily discernible, thus permitting the recognition property improvement of image. The direction of improving the dynamic range of the saturation, as shown in FIG. 17, is the direction of making the intensity to be closer to one half the maximum value (i.e., 128 in case of an intensity range of 0 to 255). Specifically, the saturation data emphasis processor 21 computes the intensity for each pixel with the following equation (5) in case of I<128 and with the following equation (6) in case of I≧128.

$$I_{o2} = I_i + (S \times \Delta max) \quad (5)$$

$$I_{o2} = I_i - (S \times \Delta max) \quad (6)$$

Figure 18:
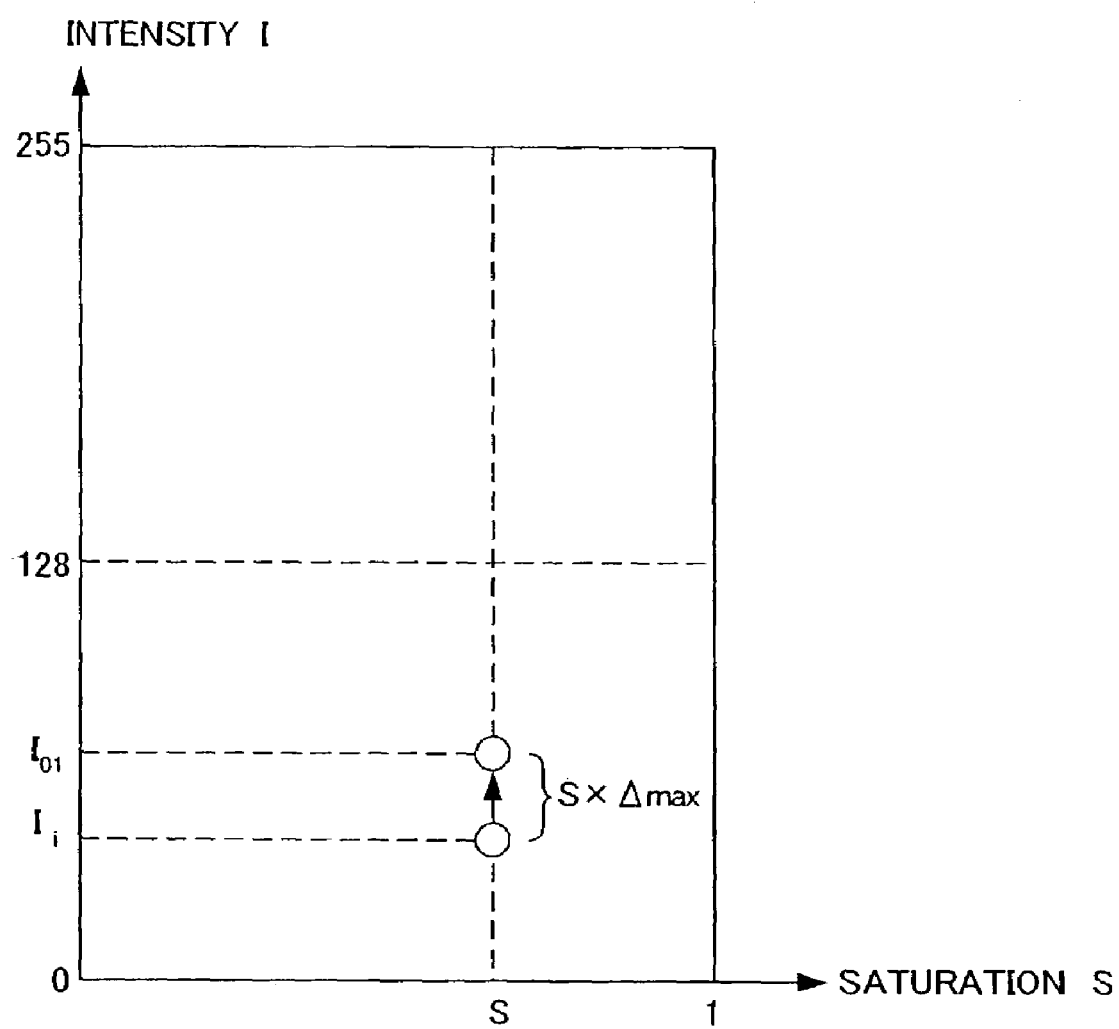
FIG. 18 is a view for describing a method of realizing the intensity data process shown in FIG. 17.
Figure 19:
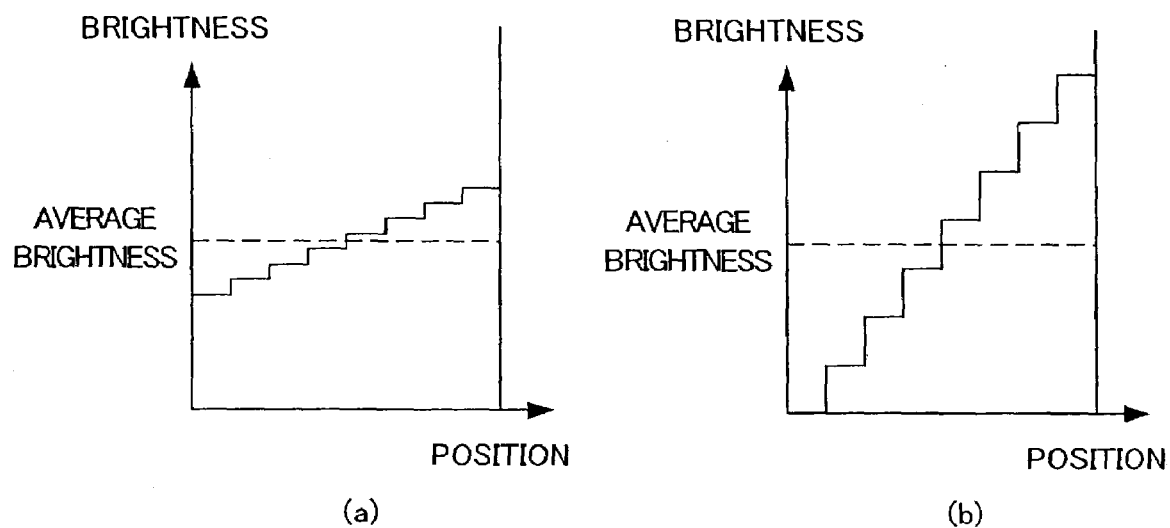
FIG. 19 is a view for describing a prior art gradation compensation method.

In these equations, $I_{o2}$ is the intensity after the shift, $I_i$ is the initial intensity, S is the saturation, and Δmax is the maximum shift. The equations (5) and (6) thus mean multiplying the saturation S having a value of "0" to "1" by the maximum shift Δmax and adding the product to the initial intensity when the initial intensity is less than 128 while subtracting the product otherwise. FIG. 18 shows an example in case of I<128.

The intensity $I_{o2}$ given by the equation (5) or (6), as computed in the saturation emphasis processor 21 is inputted, together with the intensity $I_{o1}$ outputted from the dynamic range improvement processor 4 after the same process as in the first embodiment, to the selector 22. Of these two inputs, one closer to 128 is adopted as saturation $I_{o3}$ of the pertinent pixel and inputted to the inverse color type converting means 5.

As has been shown, with the second embodiment of the present invention, in addition to the advantages obtainable with the first embodiment, the color sharpness is made more readily discernible to provide improved image recognition property when the saturation has a certain large value.

The embodiments described above are by no means limitative, and various change and modifications are possible. For example, for reducing the time for the conversion from RGB to HSI and the converse conversion from HSI to RGB in the first embodiment, a process comprising steps (1) to (3) as shown below may be executed.

(1) The intensity I is computed from the R, G and B values, while preserving the R, G and B values.

(2) A dynamic range improvement process with respect to the intensity is executed.

(3) An RGB color image is re-computed on the basis of the R, G and B values preserved in the step (1). It will be seen that neither saturation data nor hue data is computed. The color image data after the process is the same as in the first embodiment.

As has been described in the foregoing, with the color image processing method and apparatus according to the present invention, execution of the dynamic range improving process with respect to the intensity in the hue/saturation/intensity space normalized with the cylindrical coordinate system, permits execution at the same time of an improvement process with respect to the saturation to the same extent.

Also, with the color image processing method according to the present invention, with the first clip value introduced it is possible to prevent excessive contrast emphasis even in the case of a density histogram having a high frequency density part.

Furthermore, with the color image processing method according to the present invention, by determining the first clip value by taking the complexity of the texture of each region into considerations it is possible to prevent an excessive contrast emphasis process with respect to a region containing a less density difference object.

Moreover, with the color image processing method according to the present invention, by introducing the second clip value it is possible to weaken the extent of the contrast emphasis and make the intensity distribution of the whole region to a uniform level.

Changes in construction will occur to those skilled in the art and various apparently different modifications and embodiments may be made without departing from the scope of the present invention. The matter set forth in the foregoing description and accompanying drawings is offered byway of illustration only. It is therefore intended that the foregoing description be regarded as illustrative rather than limiting.

What is claimed is:

1. A color image processing method comprising:
    a step of generating, from a primary color image, an intensity image in a hue/saturation/intensity space normalized in a cylindrical coordinate system;

a step of analyzing the texture of the intensity image and dividing the intensity image into a plurality of regions based on the result of the analysis;

a step of executing density conversion of the intensity image by smoothing a histogram of each region; and a step of generating a primary color image by using the density-converted intensity image.

2. The color image processing method according to claim 1, wherein in the histogram smoothing, a density histogram is generated for each region, and a first clip value for determining the extent of the histogram smoothing is determined on the basis of the way of intensity fluctuations of each region.

3. The color image processing method according to claim 2, wherein the first clip value is determined by using the complexity of the texture of each region in addition to the way of density fluctuations of each region.

4. The color image processing method according to claim 2, wherein a second clip value preset for weakening the extent of the histogram smoothing in each region and changing the intensity distribution of the entire region to a uniform intensity, is used together with the first clip value.

5. A color image processing system comprising:

a means for generating, from a primary color image, an intensity image in a hue/saturation/intensity space normalized in a cylindrical coordinate system;

a means for analyzing the texture of the intensity image and dividing the intensity image into a plurality of regions on the basis of the result of the analysis;

a means for executing density conversion of the intensity image by smoothing a histogram of each region; and a means for generating a primary color image by using the density-converted intensity image.

* * * * *